(12) United States Patent
Tanner et al.

(10) Patent No.: US 9,100,636 B2
(45) Date of Patent: Aug. 4, 2015

(54) MOTION AND QUALITY ADAPTIVE ROLLING INTRA REFRESH

(75) Inventors: Jason D. Tanner, Folsom, CA (US); Hong Jiang, El Dorado Hills, CA (US); Sang-Hee Lee, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 163 days.

(21) Appl. No.: 13/606,416

(22) Filed: Sep. 7, 2012

(65) Prior Publication Data

US 2014/0072034 A1 Mar. 13, 2014

(51) Int. Cl.
| | | |
|---|---|---|
| *H04N 19/00* | (2014.01) | |
| *H04N 19/17* | (2014.01) | |
| *H04N 19/139* | (2014.01) | |
| *H04N 19/172* | (2014.01) | |
| *H04N 19/107* | (2014.01) | |
| *H04N 19/154* | (2014.01) | |

(52) U.S. Cl.
CPC ......... *H04N 19/0026* (2013.01); *H04N 19/107* (2014.11); *H04N 19/139* (2014.11); *H04N 19/154* (2014.11); *H04N 19/172* (2014.11)

(58) Field of Classification Search
CPC ....................................................... H04N 19/00
USPC ..................................................... 375/240.03
See application file for complete search history.

(56) References Cited

U.S. PATENT DOCUMENTS

| | | | |
|---|---|---|---|
| 6,011,870 A | 1/2000 | Jeng et al. | |
| 6,222,881 B1 | 4/2001 | Walker | |
| 8,160,144 B1 | 4/2012 | Varadarajan et al. | |
| 2002/0159523 A1* | 10/2002 | Wang et al. | 375/240.05 |
| 2006/0078051 A1* | 4/2006 | Liang et al. | 375/240.24 |
| 2006/0291558 A1* | 12/2006 | Schreier et al. | 375/240.13 |
| 2011/0134315 A1* | 6/2011 | Levy et al. | 348/441 |

FOREIGN PATENT DOCUMENTS

| | | |
|---|---|---|
| KR | 10-2003-0065694 A | 8/2003 |
| KR | 10-2012-0083209 A | 7/2012 |
| WO | 2014039148 A1 | 3/2014 |

OTHER PUBLICATIONS

International Search Report and Written Opinion received for PCT Application No. PCT /US2013/047791, mailed on Oct. 15, 2013, 9 pages.
International Preliminary Report on Patentability and Written Opinion Received for PCT Patent Application No. PCT/US2013/047791, mailed on Mar. 19, 2015, 6 pages.

* cited by examiner

*Primary Examiner* — Sath V Perungavoor
*Assistant Examiner* — Jeffery Williams
(74) *Attorney, Agent, or Firm* — Forefront IP Lawgroup, PLLC

(57) ABSTRACT

Described herein are techniques related to motion and quality adaptive rolling intra (I) macro-block (MB) that is used to encode a particular image frame. In particular, the rolling I MB configuration may be based upon global motion direction, quantization parameter (QP) value, complexity based roll, and/or QP saturation based roll.

22 Claims, 9 Drawing Sheets

MOTION AND QUALITY ADAPTIVE ROLLING INTRA REFRESH

BACKGROUND

Video coding is a process of preparing video (video data), where the video is encoded to meet proper formats and specifications for recording and playback. Motion estimation is an important and computationally intensive task in video coding and video compression.

The Video Coding Experts Group (VCEG), together with the International Organization for Standardization (ISO)/International Electrotechnical Commission (IEC) joint working group, the Moving Picture Experts Group (MPEG), has developed the Advanced Video Coding (AVC) standard. The AVC standard, or AVC, is also known as H.264. The AVC is an example of a standard for video encoding, and is one of the most commonly used formats for the recording, compression, and distribution of high definition video. Other standards include and are not limited to, Motion Pictures Experts Group 2 (MPEG2), Scalable Video Coding (SVC), and High Efficiency Video Coding (HEVC), etc.

In traditional encoding, a large intra (I) frame is used to replenish quality and remove possible errors during transmission of bitstream. To provide a lower latency encoder, the large I frame may result in dropping subsequent frames giving poor visual quality. To this end, a rolling I frame is used to obtain the low latency while also removing the possible errors. For example, instead of having an entire frame as I, a section of the entire frame and subsequent frames may have the rolling I until all parts of the frames are refreshed. In this example, the rolling I that is defined by a fix section of the frame and a fix pattern may result in quality loss during encoding.

Figure 1:
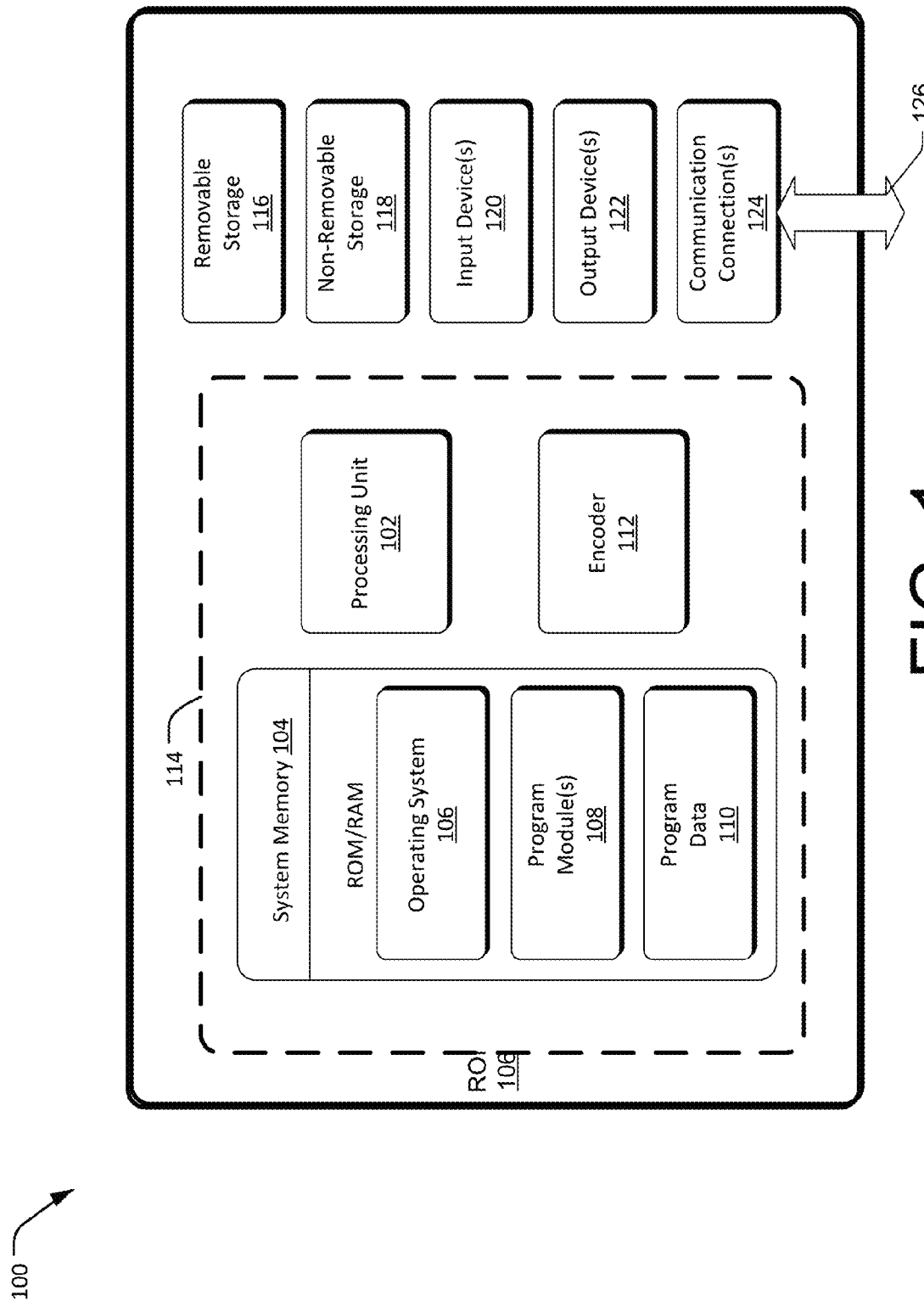
FIG. 1 illustrates an example system for implementing video encoding.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a motion and quality adaptive rolling intra or I refresh algorithm during video encoding in an encoder architecture. In an implementation, an image frame may be encoded by a video encoder to generate corresponding encoded frames in the form of encoded bit-streams. The encoded bit-streams may include series or combinations of I, predictive (P), and/or bidirectional (B) bit-streams from I, P, and B encoding approaches, respectively. In an implementation, the encoding of the image frame may include a rolling I encoding approach where a rolling I macro-block (MB) is encoded in at least one row of a first frame in a group of pictures (GOP), in another at least one row of a second frame in the GOP, etc. to lower latency during bit-rate transmission. In this implementation, the rolling I MB is adaptive and/or dynamic in nature and may be based on the following factors: first, the rolling I MB may be motion adaptive; second, it may be quality adaptive; third, it may be complexity based roll; and fourth, it may be quantization parameter (QP) saturation basedroll. The rolling I MB can be a row (or multiple rows) of MBs or a column (or multiple columns) of MBs.

In an implementation, the motion adaptive nature of the rolling I MB may include a pattern in which the rolling I MB encoding approach adapts a direction that is opposite to the direction of a global motion like a panning sequence. For example, if the global motion is upward in direction, then a first row in the first frame of the GOP may be encoded with a first rolling I MB. Similarly, if the global motion is downward in direction, then a bottom row in the first frame may be encoded first with the rolling I MB or frame. In these two examples, the direction pattern of the rolling I MBs that are to be encoded may be dynamically adjusted based upon the direction of the detected global motion.

In an implementation, the rolling I MB may be quality adaptive. For example, a first frame with a higher QP may spend a higher number of bits for an update such as, encoding the rolling I MB in a bigger region of the first frame to improve quality. Similarly, the first frame with a low QP (i.e., good quality) may require a smaller region for the rolling I MB update. In these two examples, the size of the region for the rolling I MBs to be encoded may be dynamically adjusted based upon the QP value of the frame where the rolling I MB is encoded.

In an implementation, the rolling I MB may be complexity based roll. For example, if the first frame has higher details (e.g., high encoded bit-streams), then a lower number of the rolling I MB may be encoded into the first frame e.g., single rolling I MB is encoded. Similarly, if the first frame has low details (e.g., static frame that includes low encoded bit-streams), then a higher number of the rolling I MB may be encoded into the first frame e.g., two rolling I MBs are encoded. In these two instances, the number of the rolling I MB to be encoded for a particular frame may be dynamically adjusted based upon the complexity of the encoded bit-streams.

In an implementation, the rolling I MB may be QP saturation based roll. For example, when a desired QP value is obtained for a given workload (e.g., lowest QP for the first frame is obtained), then a width of the rolling I MB may be increased so that the encoded bit-stream is more error resilient. In this example, the amount to roll may be based upon bits being used and the remaining bits in a bitrate budget. The rolling I MB for this case may include a bigger area or region.

Accordingly, the region for the rolling I MB may be dynamically adjusted based upon attainment of the desired QP value for the given workload.

FIG. 1 shows an example system that may be utilized to implement various described embodiments. However, it will be readily appreciated that the techniques disclosed herein may be implemented in other computing devices, systems, and environments. The computing device 100 shown in FIG. 1 is one example of a computing device and is not intended to suggest any limitation as to the scope of use or functionality of the computer and network architectures.

In at least one implementation, computing device 100 includes at least one processing unit 102 and system memory 104. Depending on the exact configuration and type of computing device, system memory 104 may be volatile (such as RAM), non-volatile (such as ROM, flash memory, etc.) or some combination thereof. System memory 104 may include an operating system 106, one or more program modules 108, that in certain implementations may implement the motion and quality adaptive rolling I refresh algorithm methods and techniques describe herein. System memory 104 may further include program data 110 which may include MB or shapes database(s) as described later in this document. Furthermore, an encoder 112 is included in this example. The encoder 112 may be used to implement video encoding, motion estimation, motion compensation, etc. as describe herein. The encoder 112 may be operatively coupled to and communicate with processing unit 102, system memory 104, and other memory, input/output, devices, further described herein, and other components/devices not shown. A basic implementation of the computing device 100 is demarcated by a dashed line 114. For example, in certain implementations, encoder 112 may be part of an integrated graphics chip set in of central processing units (CPU) that includes 3D and media, having media functionality that includes video, specifically video decode/encode. In certain implementations, an application specific integrated circuit or ASIC may include the encoder 112 as a fixed function encoder.

It is contemplated that devices with video encoding may make use of the techniques, methods, and devices described. Examples of such devices include media players, video conferencing devices, etc.

In certain implementations, program modules 108 may include specific modules (not shown) such as a codec or software/firmware based encoder, configured to implement the video encoding techniques and methods described herein. For example, such modules in certain implementations may perform the processes of encoder 112. Example codecs include AVC, VC1, ATVC, and SVC.

Computing device 100 may have additional features or functionality. For example, computing device 100 may also include additional data storage devices such as removable storage 116 and non-removable storage 118. In certain implementations, the removable storage 116 and non-removable storage 118 are an example of computer accessible media for storing instructions that are executable by the processing unit 102 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 100. Any of such computer accessible media may be part of the computing device 100.

In one implementation, the removable storage 116, which is a computer accessible medium, has a set of instructions stored thereon. When executed by the processing unit 102, the set of instructions cause the processing unit 102 to execute operations, tasks, functions and/or methods as described herein, and any variations thereof.

Computing device 100 may also include one or more input devices 120 such as keyboard, mouse, pen, voice input device, touch input device, etc. Computing device 100 may additionally include one or more output devices 122 such as a display, speakers, printer, etc.

Computing device 100 may also include one or more communication connections 124 that allow the computing device 100 to communicate by wire or wirelessly with one or more other devices (not shown), over connection 126. It is appreciated that the illustrated computing device 100 is one example of a suitable device and is not intended to suggest any limitation as to the scope of use or functionality of the various embodiments described.

Figure 2:
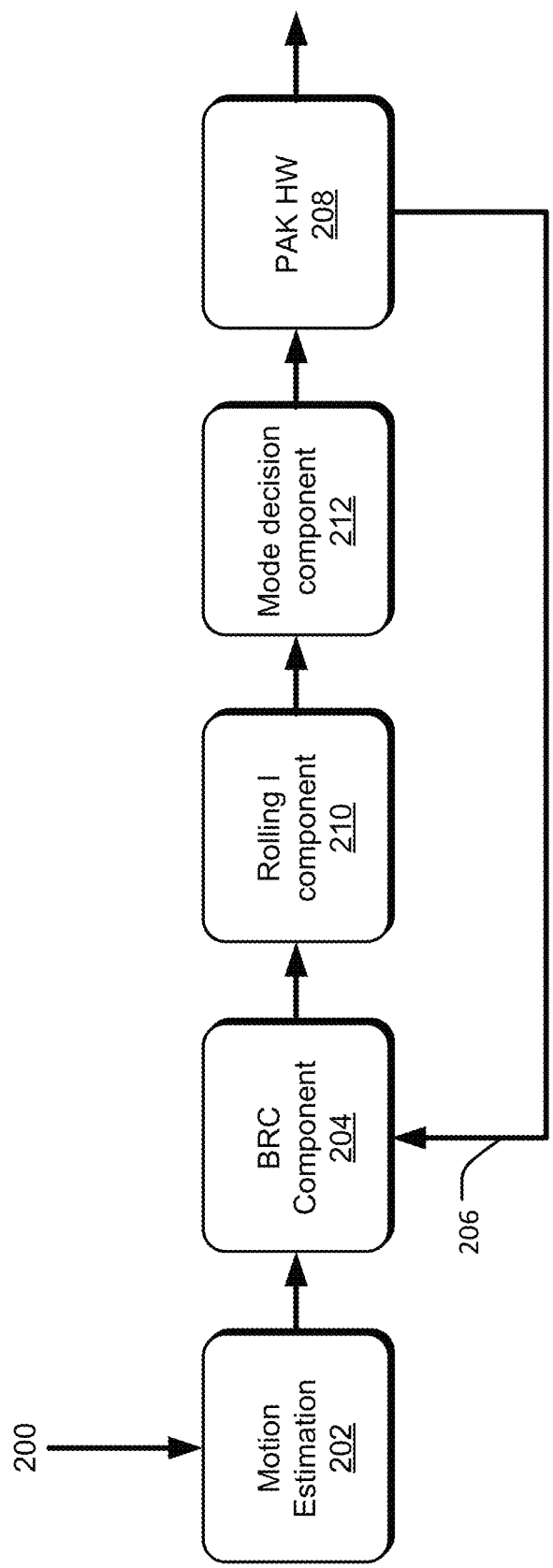
FIG. 2 illustrates an example encoder architecture to implement motion and quality adaptive rolling intra (I) refresh algorithm.

FIG. 2 shows an example video encoder 112 that implements the motion and quality adaptive rolling I refresh algorithm when encoding a particular image frame (or sub-frame). In this implementation, the motion and quality adaptive rolling I refresh algorithm may allow high quality and high performance encoding during the video compression by calculating in advance a dynamic and adaptive rolling I to be encoded in the bitstream. In certain implementations, the video encoder 112 may be implemented as part of a central processing unit, part of integrated circuit chipset, or be a separate component/device. As discussed above, in certain implementations, the video encoder 112 may be implemented as firmware or software, such as a codec. Furthermore, FIG. 2 is merely illustrative and may contain additional blocks or components and/or different arrangement of the blocks or components.

In an implementation, the video encoder 112 may receive from video input 200 image frames that are to be encoded to generate corresponding encoded frames in the form of encoded bit-streams, which may include series or combinations of I, P, and/or B bit-streams. In this implementation, one or more blocks of the video encoder 112 may be configured to perform video encoding consistent with one or more standards such as, MPEG, H.264, etc. In an implementation, the received image frame from the video input 200 may be processed by a motion estimation component 202 for encoding of the received image frame into either I-frame and/or inter-coded frames (e.g., P-frame or B-frame) encoding approaches. The I frame encoding refers to an encoding approach in which the MBs of the image frame are represented based on the MBs of the same frame (i.e., the image frame is coded without reference to any other image frame except itself). In this implementation, the motion estimation component 202 may encode the I frame by using spatial compression technique such as the adaption of the motion and quality adaptive rolling I MB that may be encoded in at least one row (not shown) of different frames in the GOP (not shown). The GOP may include series and or combinations of the I, P, and/or B frames for the I, P, and/or B frame encoding approaches, respectively. Furthermore, the motion estimation component 202 may generate motion vectors representing displacement between the MBs (not shown) in the P-frame or the B-frame, which may include reference frames in the encoding approach. The motion estimation component 202 may use previously stored image frames (not shown) as a basis for the encoding approach of the P-frame and the B-frame.

In an implementation, the motion estimation component 202 may receive user defined frame limits (e.g., target or desired QP value, user specified target frame size, initial QP value, etc.) that may be used for calculation of the rolling I MB (e.g., rolling width) to be encoded in the frames (not shown) of the GOP (not shown). In this implementation, the rolling I MB may be motion adaptive i.e., based upon direction of the global motion that is derived through standard algorithm (e.g., hierarchical motion estimation (HME)) in the motion estimation component 202. Furthermore, the rolling I MB may be based upon the QP (i.e., quality adaptive), or it may be based upon frame complexity (i.e., complexity based roll), or it may be based upon the QP saturation based roll. The at least four basis for the dynamic adjustment of the rolling I MB are further discussed in FIGS. 3 and 4 below.

In an implementation, the user defined frame limits may be utilized by a bit rate control (BRC) component 204 to dynamically adjust encoder parameters to achieve a target bitrate. For example, the user defined frame limits may be used to calculate the QP and/or to calculate current frame size boundaries (e.g., rolling I MB width) during the encoding of the received image frame. Furthermore, the BRC component 204 may receive additional data such as, historical data, current frame type, final QP, coefficients, statistics, and the like, from a feedback loop 206. For example, the feedback loop 206 may include previous frame statistics, frame sizes, final QP, spatial frame details, and other coefficients and/or variables that were utilized and/or implemented by a PAK HW component 208 during the bit-rate transmission for the GOP (not shown). In an implementation, the PAK HW component 208 may perform the bit-rate transmission based on a separate, independent and single pass.

In an implementation, the BRC component 204 may supply the dynamically adjusted encoder parameters such as, the calculated QP, desired QP, calculated frame size, current frame type, current frame details if higher or lower, historical data, bit-rate, frame complexity estimation, global motion direction, etc. to a rolling I component 210. In this implementation, the rolling I component 210 may implement the motion and quality adaptive rolling I refresh algorithm to provide final configuration of the rolling I MB at a mode decision component 212. For example, the rolling I component 210 may statistically determine in advance the width or height (not shown) for the rolling I MB to be encoded based on the received QP, frame details, direction of the global motion, etc.

In an implementation, the mode decision component 212 may include different mode decisions for the encoding of the image frame. For example, the different mode decisions are zero motion vectors (ZMV) encoding, HME, integer motion estimation (IME), etc. In this example, the mode decision component 212 may provide an output GOP (not shown) that includes series of frames (not shown) with the encoded rolling I MBs. In an implementation, the final configuration of the rolling I MB in the GOP (not shown) is implemented through the PAK HW component 208 that performs bit-rate transmission for the output GOP (not shown) of the mode decision component 212.

Figure 3A:
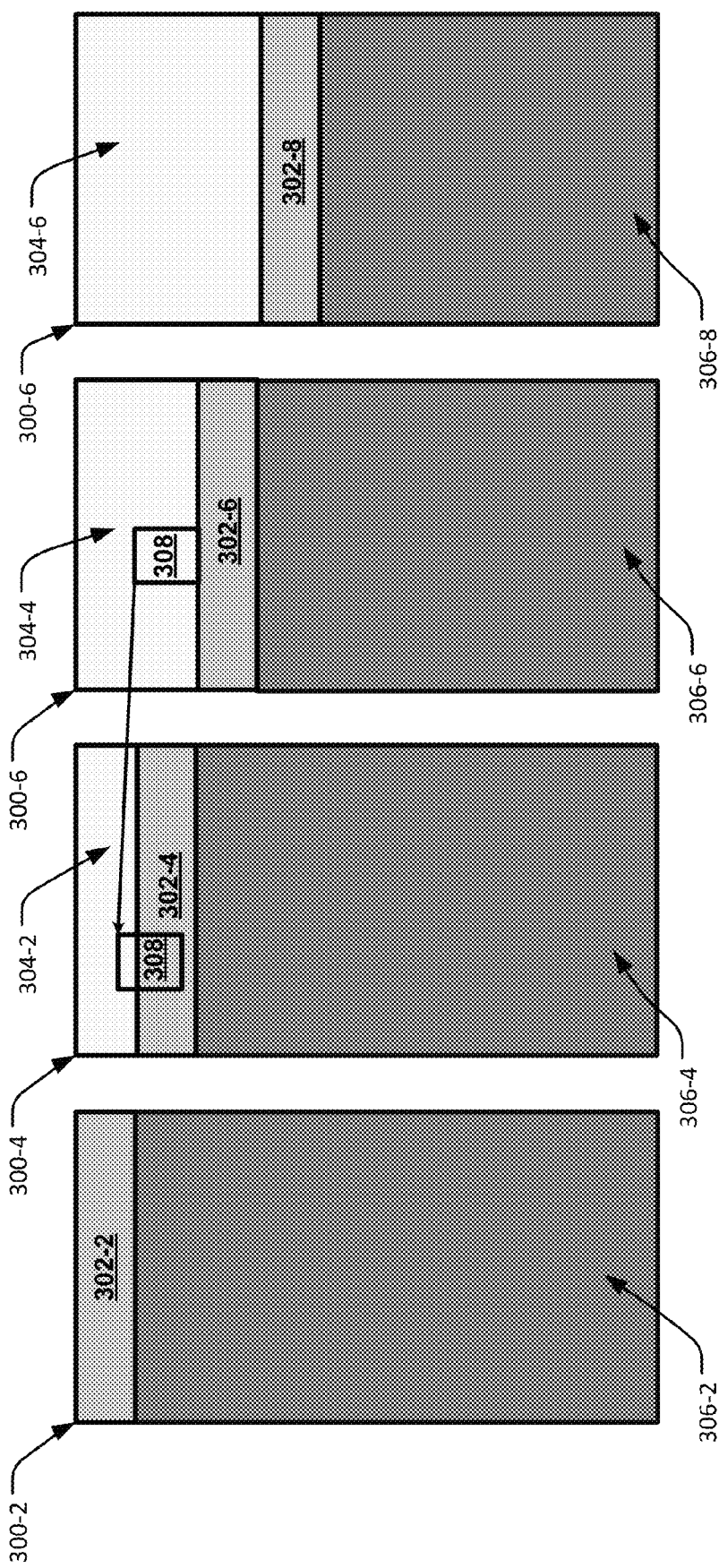
FIG. 3A illustrates an example group of pictures (GOP) that includes an encoded rolling intra (I) macro-block (MB).

FIG. 3A illustrates an example GOP 300 that includes an encoded rolling I MB 302 to obtain low latency encoding. In an implementation, the GOP 300 may include a first frame 300-2, a second frame 300-4, a third frame 300-4, etc. that may include the series and/or combinations of the I, P, and/or B encoding approaches. In this implementation, the rolling I MB 302 may be encoded on different rows of the GOP 300 frames to provide the low latency in the video encoder 112. For example, the rolling I MB 302-2 may be encoded on a first row of the first frame 300-2, the rolling I MB 302-4 may be encoded on a second row of the second frame 300-4, the rolling I MB 302-6 may be encoded on a third row of the third frame 300-6, etc. In this example, the number and/or size of rolling width of the rolling I MB 302 that may be encoded in one frame (e.g., first frame 300-2) may be calculated by the motion and quality adaptive rolling I refresh algorithm. In an implementation, regions 304 of the GOP 300 may represent portions of the GOP 300 that has been refreshed or the quality has been replenished, while regions 306 may represent portions of the GOP 300 that are non-replenished. In this implementation, a subsequent MB 308 in the refreshed regions such as in region 304-4 of the third frame 300-6 may refer or use as a reference a previous MB 308 that may be located in the replenished region (e.g., region 304-2) or the rolling I MB 302-4 region of the previous second frame 300-4.

Figure 3B:
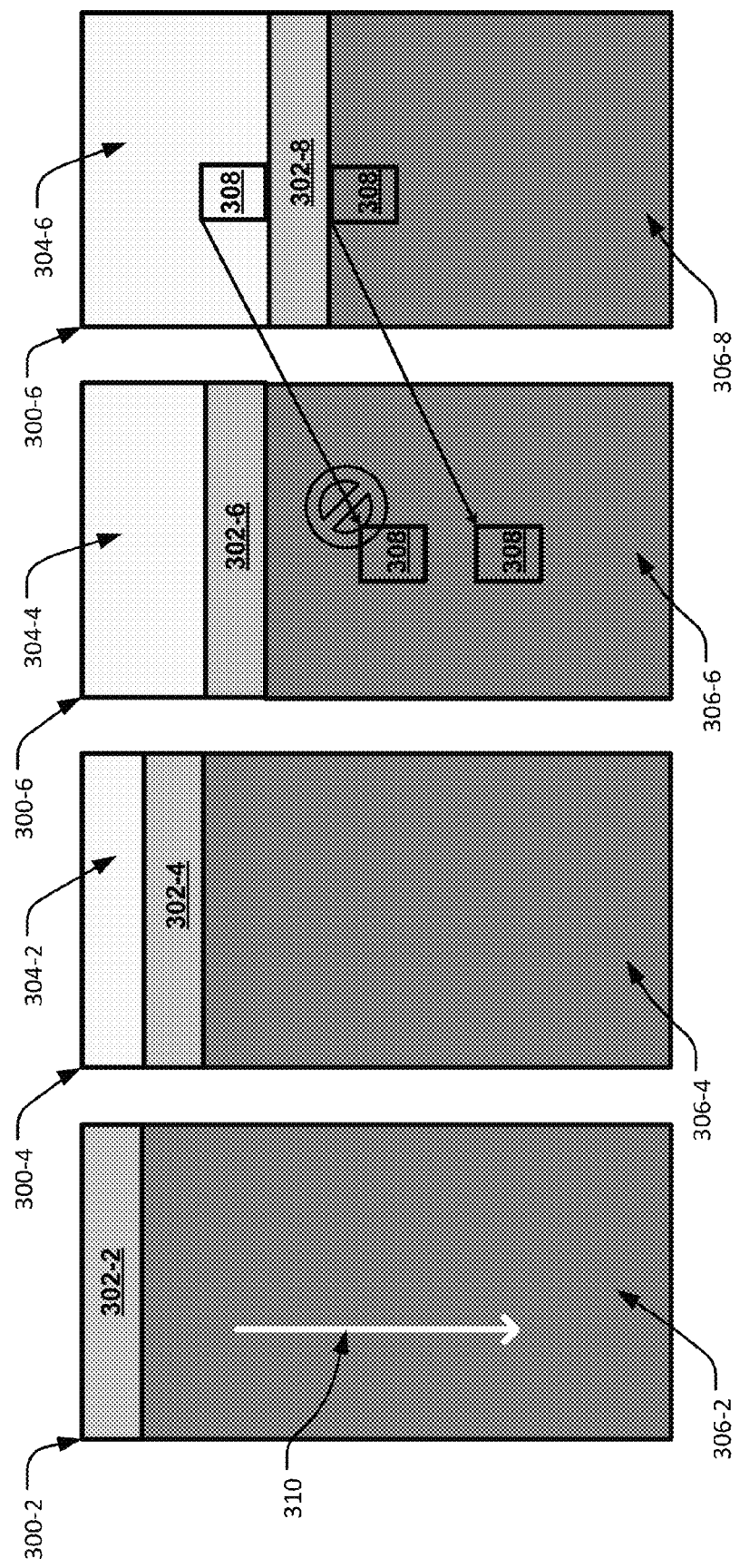
FIG. 3B illustrates an example encoding of a rolling intra (I) macro-block (MB) that adapts direction of a global motion.

FIG. 3B illustrates an example encoding of the rolling I MB 302 that is configured to run in the same direction with a computed global motion 310. In an implementation, a best fit for the MB 308 may be located in last and fourth frame 304-6 and particularly, in the non-replenished region 306-8. Since the quality (not shown) has not been replenished in this region 306-8, the MB 308 may not use the motion vector (not shown) in the region 306-8—where the best fit for the MB 308 may be located. In other words, either a sub-optimal MB 308 may need to be selected in the replenished region 304-6 or the MB 308 may be encoded as the rolling I MB 302-8. However, both of these options are less efficient than capturing the accurate motion. For example, the non-replenished region 304-6 may still refer to the non-replenished region 306-6, but it has a higher likelihood of having errors and further propagating errors in the bitstream.

Figure 3C:
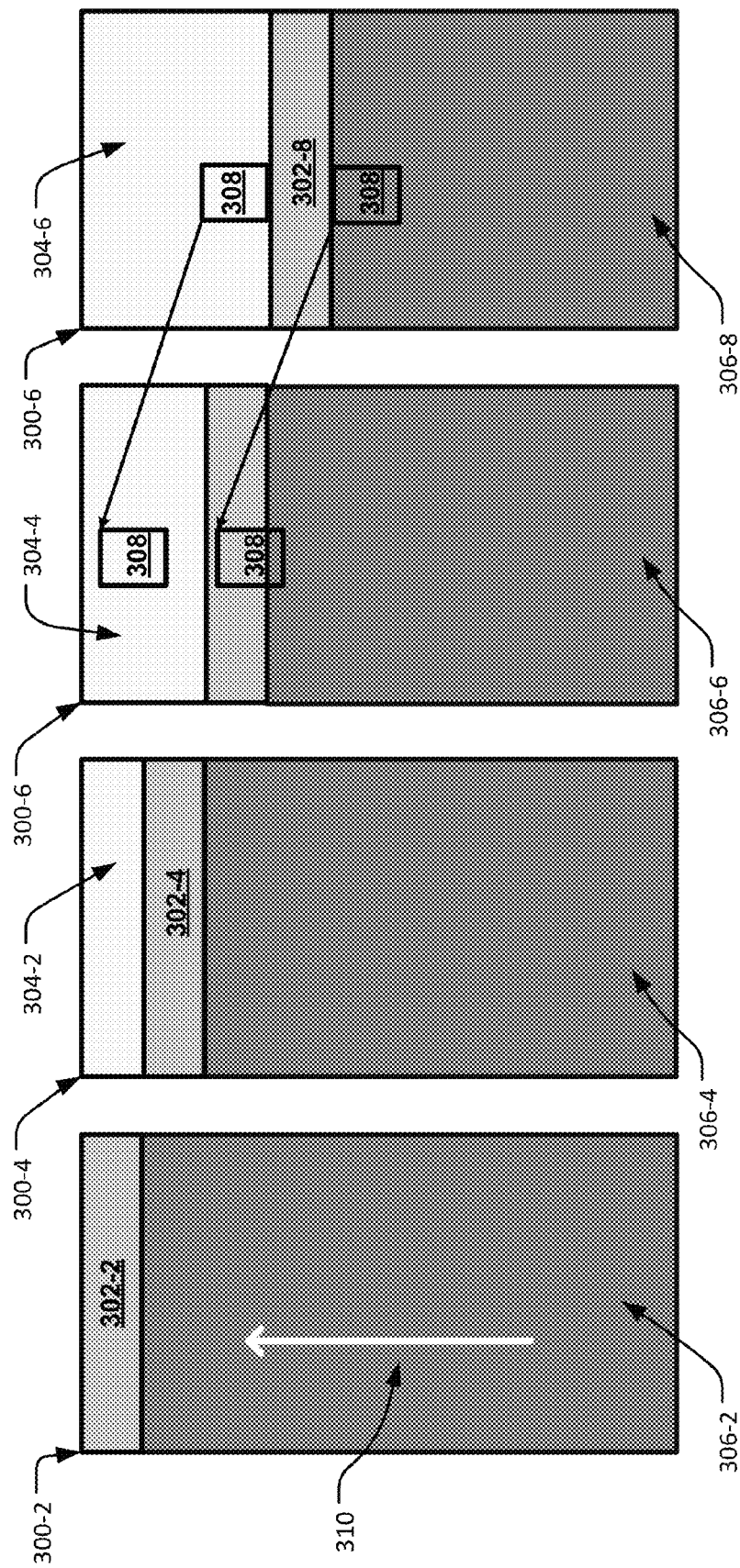
FIG. 3C illustrates an example encoding of a rolling intra (I) macro-block (MB) that adapts a direction opposite to the direction of a global motion.

FIG. 3C illustrates an example encoding of the rolling I MB 302 that is configured to run in opposite direction of the global motion 310. In an implementation, the rolling I MB 302 may be encoded to start in a direction opposite to the direction as the global motion 310. For example, the rolling I MB 302-2 may encoded on the first row of the first frame 300-2 when the global motion is moving upward in the first frame 300-2. In an implementation, the MB 308 in the replenished region 304-6 may refer to the previous MB 308 in the replenished region 304-4 to give a higher compression efficiency as opposed to FIG. 3B—where the MB 308 utilizes the previous MB in the non-replenished region 306-6 when the rolling I MB 302 runs in the same direction as the global motion 310. Furthermore, with continuing reference to FIG. 3C, the MB 308 in the non-replenished region 306-8 may likely to find a match in the replenished region 304-4 or the region defined by the rolling I MB 302-6. In these two instances, the higher compression efficiency are obtained and the replenishing of the GOP 300 frames is faster while the risk of propagating error is decreased.

Figure 4:
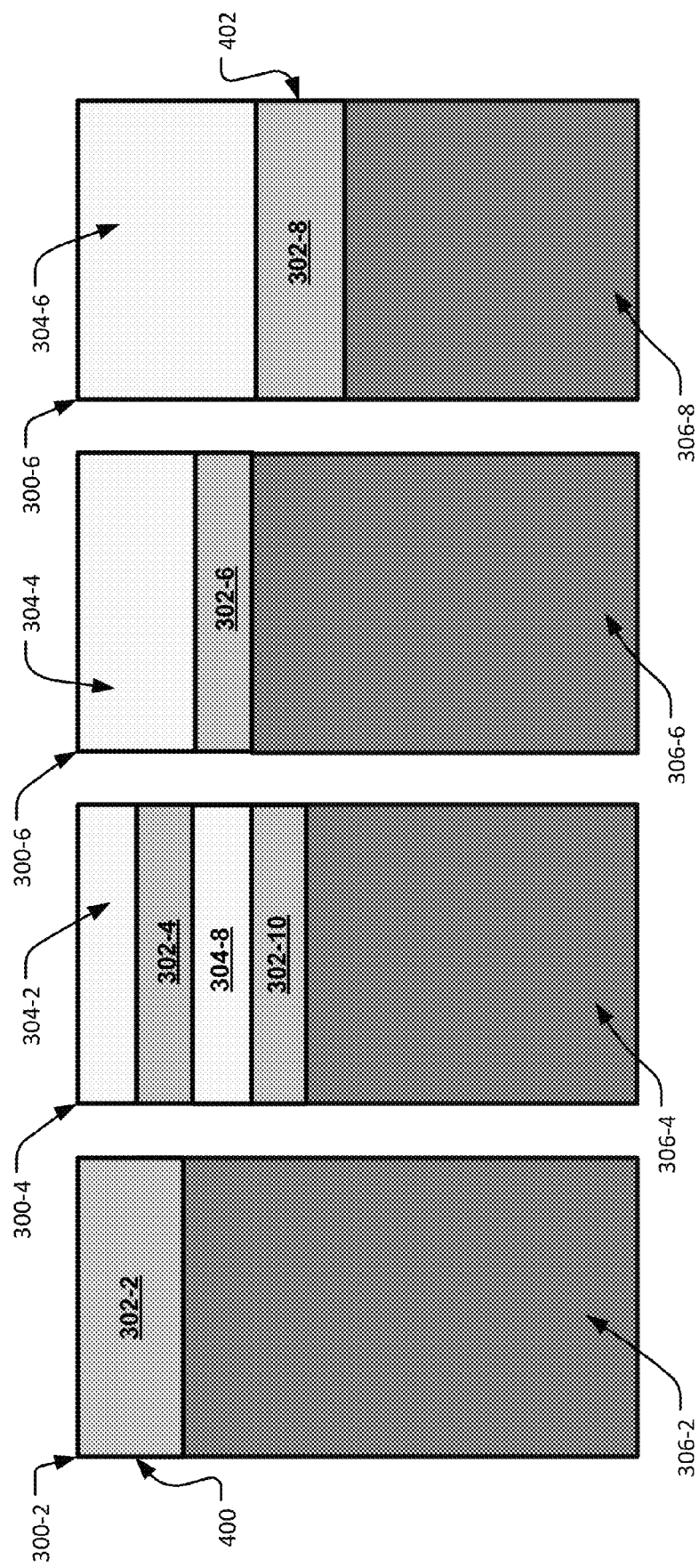
FIG. 4 illustrates different configurations of an encoded rolling intra (I) macro-block (MB).

FIG. 4 illustrates different configurations for the encoded rolling I MB 302 in the GOP 300. In an implementation, the rolling I MB 302 may be quality adaptive. For example, if the first frame 300-2 includes a higher QP value (not shown), then a higher number of bits (not shown) may be spent for an update such as, encoding the rolling I MB 302-2 in a bigger region 400 (i.e., bigger rolling width) to improve quality. Similarly, the first frame with a low QP value (i.e., good quality) may require a smaller region 400 for the rolling I MB 302-2 update. In these two examples, the size of the region 400 for the rolling I MB 302 to be encoded may be dynamically adjusted by the rolling I component 210 based upon the QP value (not shown) of the frame (e.g., first frame 300-2) in the GOP 300.

In an implementation, the rolling I MB 302 may be complexity based roll. For example, if the second frame 300-4 includes higher details (e.g., high encoded bit-streams), then a single rolling I MB 302-4 may be encoded into the second frame 300-4. Otherwise, if the second frame 300-4 includes low details (e.g., static frame that includes low encoded bit-streams), then at least the rolling I MBs 302-4 and 302-10 may be encoded into the second frame 300-4. In these two examples, the number of the rolling I MBs 302 to be encoded may be dynamically adjusted by the rolling I component 210 based upon the complexity of the encoded bit-streams.

In an implementation, the rolling I MB 302-8 may be QP saturation based roll. For example, when a desired QP value (not shown) is obtained for a given workload (e.g., for the fourth frame 300-8), then a width 402 of the rolling I MB 302-8 may be increased so that the encoded bit-stream (not shown) is more error resilient. In this example, the amount to roll (i.e., rolling I MB 302-8) may be based upon bits (not shown) being used and the remaining bits in a bitrate budget in the BRC component 204. If the bits being used are smaller in number (e.g., static frame 300-6), then the rolling I MB 302-8 may include a bigger area or region 402. Accordingly, the size of the rolling I MB 302 may be dynamically adjusted by the rolling I component 210 based upon the QP saturation based roll.

Figure 5:
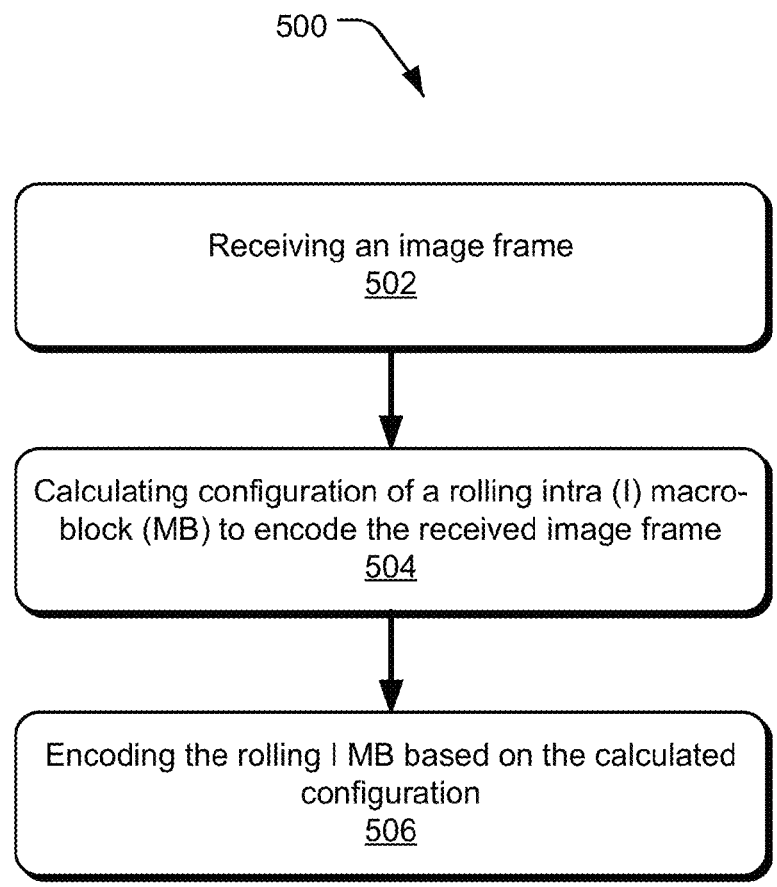
FIG. 5 is an example method for implementing motion and quality adaptive rolling intra (I) refresh algorithm in a video encoder device.

FIG. 5 shows an example process flowchart 500 illustrating an example method for implementing the motion and quality adaptive rolling I refresh algorithm in a video encoder. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, receiving an image frame is performed. In an implementation, a motion estimation component (e.g., motion estimation component 202) may receive the image frame from a video input component (e.g., video input component 200). In this implementation, the motion estimation component 202 may perform standard algorithm (e.g., HME) to calculate global motion (e.g., global motion 310) such as a panning sequence in the received image frame. The calculation of the global motion 310 using standard algorithm may include determination of global motion 310 directions.

At block 504, calculating configuration of a rolling I MB to encode for the received image frame. In an implementation, a rolling I component (e.g., rolling I component 210) may perform a motion and quality adaptive rolling I refresh algorithm to calculate configuration of the rolling I MB (e.g., rolling I MB 302) to be encoded in GOP frames (e.g., GOP 300 frames)—as bit-streams representations for the received image frame. For example, the motion and quality adaptive rolling I refresh algorithm may utilize the determined direction of the global motion 310, or it may utilize desired QP value in user defined frame limits for the desired QP value, or it may utilize maximum or QP saturation value for a particular frame in the GOP 300 frames, and/or it may utilize complexity of regions (e.g., region 402) in the rolling I MB (e.g., rolling I MB 302). In an implementation, the motion and quality adaptive rolling I refresh algorithm may be performed in advance to calculate the rolling I MB 302 for different frames (e.g., first frame 300-2) in a GOP (e.g., GOP 300 frames).

At block 506, encoding the rolling I MB 302 based on the calculated configuration. In an implementation, a mode decision component (e.g., mode decision component 212) may integrate the calculated configuration for the rolling I MB 302 to be encoded in the GOP frames 300. For example, the rolling I MB 302 may be encoded in opposite direction of the global motion 310. In another example, the rolling I MB 302 may be encoded depending upon the QP value, spatial details, or QP saturation value for the frame (e.g., first frame 300-2) in the GOP 300 frames.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

Figure 6:
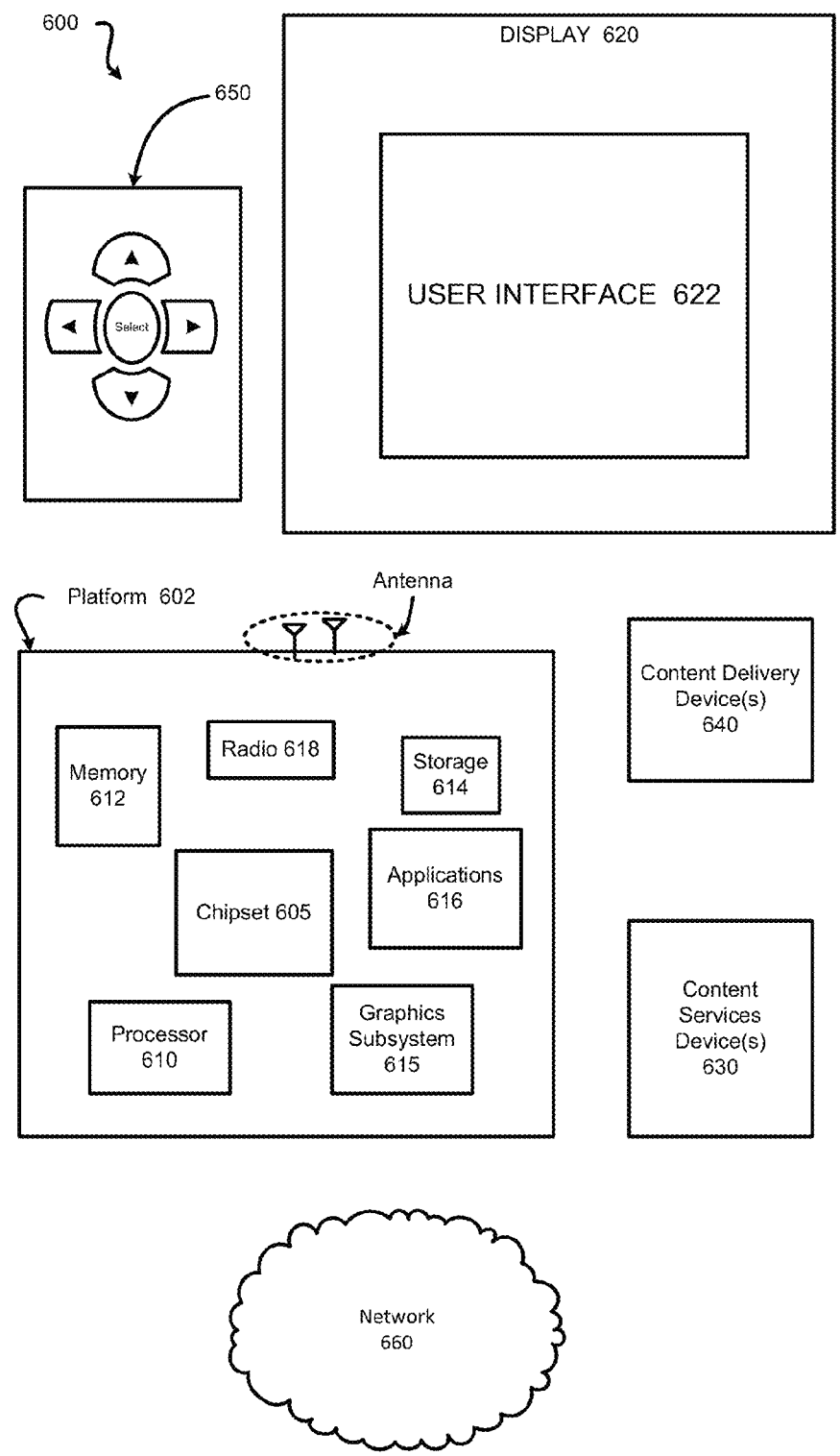
FIG. 6 is an illustrative diagram of an example system that implements motion and quality adaptive rolling intra refresh.

FIG. 6 illustrates another example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
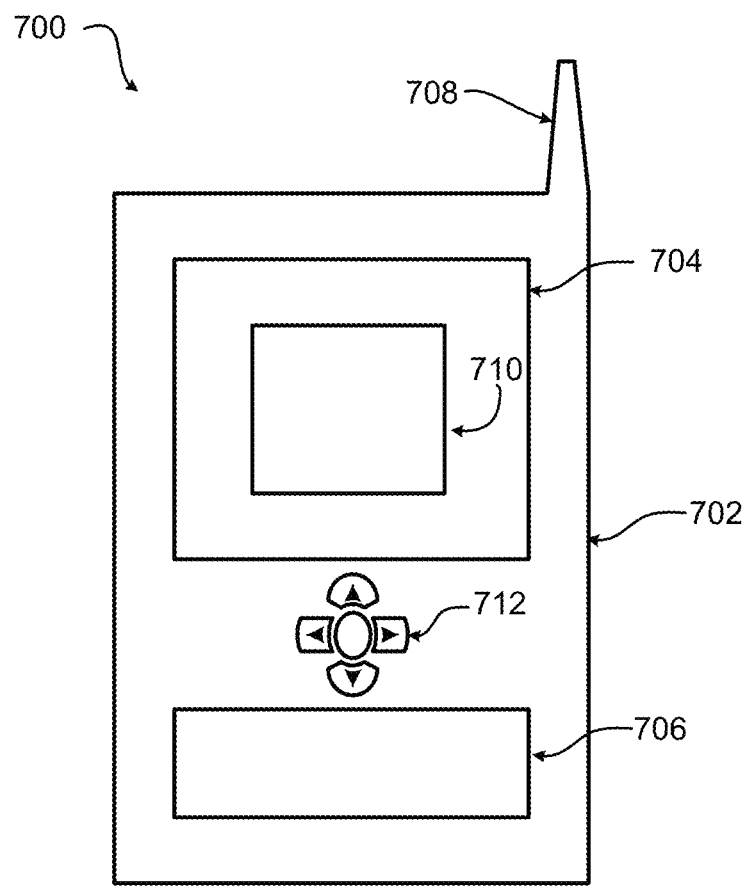
FIG. 7 is an illustrative diagram of an example device, all arranged in accordance with at least some implementations of present disclosure.

As described above, system 600 may be embodied in varying physical styles or form factors. FIG. 7 illustrates implementations of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A device, comprising:
a motion estimation component to receive a current image frame to be encoded; and
a rolling intra (I) component to dynamically determine a configuration of a rolling I region of the current frame in response to at least one of:
a global motion direction across a group of frames;
a value of a Quantization Parameter (QP Value) of the current image frame, and increasing a width or height of the rolling I region in response to the QP value reaching a QP threshold value; or
a complexity of the current image frame.

2. The device of claim 1, wherein dynamically determining the configuration in response to the global motion direction comprises specifying a motion of the rolling I region that is opposite in direction to the global motion direction.

3. The device of claim 1, wherein dynamically determining the configuration in response to the QP value comprises increasing a width or height of the rolling I region in response to the QP value of the current frame having a larger value than a QP value of a previous image frame.

4. The device of claim 1, wherein dynamically determining the configuration in response to the complexity of the current frame comprises increasing a width or height of the rolling I region in response to the current frame having greater complexity than a previous image frame.

5. The device of claim 1, wherein increasing a width or height of the rolling I region in response to the QP value reaching a threshold value comprises determining the width or height of the rolling I region in response to a bitrate budget.

6. The device of claim 5, wherein determining the width or height of the rolling I region in response to the bitrate budget comprises comparing a number of bits needed to encode the current frame with a number of bits remaining in the bitrate budget.

7. The device of claim 1 wherein the motion estimation component performs hierarchical motion estimation to compute the global motion direction.

8. The device of claim 1 wherein the rolling I component utilizes user defined frame limits to determine the QP value or the QP threshold value.

9. The device of claim 1 wherein the rolling I component determines the rolling I macro-block (MB) configuration in advance for different frames in a group of picture (GOP) frames.

10. The device of claim 1 further comprising a bit rate control (BRC) component to determine the bitrate budget.

11. A video encoder comprising:
a motion estimation component to receive a current image frame to be encoded;
a rolling intra (I) component to dynamically determine a configuration of a rolling I region of the current image frame in response to at least one of:
a direction of a global motion across a group of frames;
a value of a Quantization Parameter (QP) of the current image frame;
a complexity of the current image frame; or
a QP saturation value of the current image frame; and
a mode decision component to integrate calculated configuration of the rolling I macro-block (MB) to be encoded for bit-rate transmission, wherein the rolling I component utilizes user defined frame limits to calculate the QP value or the QP saturation value.

12. The video encoder of claim 11 wherein the motion estimation component performs a standard algorithm to compute the direction of the global motion.

13. The video encoder of claim 11 wherein the rolling I component performs motion and quality adaptive rolling I refresh algorithm in advance to calculate rolling I MB configuration for different frames in a group of picture (GOP) frames.

14. The video encoder of claim 11 wherein the complexity of the frame includes encoding a relatively lesser number of rolling I MBs for higher detailed frames while a relatively higher number of rolling I MBs are encoded for low detailed frames.

15. The video encoder of claim 11 further comprising increasing a rolling width of the rolling I MB when a desired QP value is obtained.

16. The video encoder of claim 11 further comprising a bit rate control (BRC) component that budgets bitrate wherein adjusting amount to roll in the rolling I MB is based upon number of bits that are being used, and remaining bits in a bitrate budget in the BRC component.

17. A method of implementing a motion and quality adaptive rolling intra (I) refresh algorithm in video encoding comprising:
receiving an image frame;
calculating configuration of a rolling I macro-block (MB) to encode the received image frame, wherein the configuration of the rolling I MB is based upon:
a direction of a global motion across a group of frames, wherein the rolling I MB adaptively follows the direction opposite to the global motion direction;
quantization parameter (QP) value of a frame where the rolling I MB is encoded, wherein a relatively high QP value includes a bigger rolling width for the rolling I MB while a relatively low QP value includes a smaller rolling width for the rolling I MB;

complexity of the frame wherein at least one rolling I MB is encoded in the frame based upon amount of details of the frame; and QP saturation value of the frame; and encoding the rolling I MB in the frame based upon the calculated configuration.

18. The method of claim 17 wherein the direction of the global motion is calculated by utilizing algorithm used in hierarchical motion estimation (HME).

19. The method of claim 17 wherein receiving an image frame includes receiving user defined frame limits to calculate the QP value or the QP saturation value.

20. The method of claim 17 wherein the complexity of the frame includes encoding a relatively lesser number of rolling I MBs for higher detailed frames while a relatively higher number of rolling I MBs are encoded for low detailed frames.

21. The method of claim 17 wherein the QP saturation value of the frame includes increasing the rolling width of the rolling I MB when a desired QP value is obtained.

22. The method of claim 17 wherein the calculating configuration of the rolling I MB is performed in advance.

* * * * *